(12) United States Patent
Schmieder et al.

(10) Patent No.: US 10,012,178 B2
(45) Date of Patent: Jul. 3, 2018

(54) INJECTOR, IN PARTICULAR AN INJECTOR FOR GASEOUS FUELS

(71) Applicant: Robert Bosch GmbH, Stuttgart (DE)

(72) Inventors: Dietmar Schmieder, Markgroeningen (DE); Martin Mueller, Moeglingen (DE); Sven Krissler, Stuttgart (DE); Olaf Schoenrock, Stuttgart-Weilimdorf (DE); Hagen Kuckert, Bietigheim-Bissingen (DE); Andreas Vogt, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 291 days.

(21) Appl. No.: 14/741,625

(22) Filed: Jun. 17, 2015

(65) Prior Publication Data

US 2015/0377185 A1    Dec. 31, 2015

(30) Foreign Application Priority Data

Jun. 26, 2014    (DE) .................. 10 2014 212 339

(51) Int. Cl.
F02M 21/02    (2006.01)

(52) U.S. Cl.
CPC ..... *F02M 21/0269* (2013.01); *F02M 21/0254* (2013.01); *F02M 21/0275* (2013.01); *Y02T 10/32* (2013.01)

(58) Field of Classification Search
CPC ........... F02M 21/0269; F02M 21/0254; F02M 21/0275; Y02T 10/32

USPC ......................................................... 123/294
See application file for complete search history.

(56) References Cited

U.S. PATENT DOCUMENTS

| | | | | |
|---|---|---|---|---|
| 2001/0032612 A1* | 10/2001 | Welch | ...................... | F02D 41/20 123/294 |
| 2006/0043220 A1* | 3/2006 | Leroux | .............. | F02M 21/0254 239/585.1 |
| 2007/0063160 A1* | 3/2007 | Suzuki | ................ | F16K 31/0655 251/129.21 |
| 2010/0043758 A1* | 2/2010 | Caley | .................. | F02M 21/0254 123/490 |
| 2010/0183993 A1* | 7/2010 | McAlister | ............ | F02M 57/005 431/254 |
| 2011/0048381 A1* | 3/2011 | McAlister | .......... | F02M 51/0671 123/472 |
| 2011/0233308 A1* | 9/2011 | McAlister | .......... | F02M 51/0671 239/533.2 |
| 2013/0299610 A1* | 11/2013 | Takiguchi | .......... | F02M 21/0254 239/585.1 |
| 2014/0224903 A1* | 8/2014 | Fujino | ................ | F02M 51/0664 239/585.1 |

* cited by examiner

*Primary Examiner* — Stephen K Cronin
*Assistant Examiner* — Susan Scharpf
(74) *Attorney, Agent, or Firm* — Norton Rose Fulbright US LLP; Gerard Messina

(57) ABSTRACT

An injector, in particular a blow-in injector for gaseous fuel, including a first sealing element and a second sealing element, and in the closed state of the injector a first sealing region is configured between the first and second sealing element, at least one of the sealing elements having an elastic deformation region, the elastic deformation region being set apart from the sealing region between the first and second sealing element.

8 Claims, 4 Drawing Sheets

INJECTOR, IN PARTICULAR AN INJECTOR FOR GASEOUS FUELS

RELATED APPLICATION INFORMATION

The present application claims priority to and the benefit of German patent application no. 10 2014 212 339.9, which was filed in Germany on Jun. 26, 2014, the disclosure of which is incorporated herein by reference.

FIELD OF THE INVENTION

The present invention relates to an injector and in particular to a blow-in injector for gaseous fuels.

BACKGROUND INFORMATION

In addition to conventionally used liquid fuels, the use of gaseous fuels such as natural gas or hydrogen has increased over the past few years. However, the known injectors for liquid fuels are only conditionally suitable for such gaseous fuels, since gaseous fuels have different energy densities and volumes than liquid fuels. To ensure that internal combustion engines operated in this manner do not consume excessive fuel, it is necessary to inject the most precise gas quantities possible in each injection. The injector must also provide sufficient tightness between the individual injection processes. One advantageous sealing material for injectors operated using gaseous fuel would be elastomer materials. However, one problem inherent in such elastomeric seals is their limited temperature resistance and their susceptibility to wear, which prevents their use especially in the direct injection of gaseous fuel into a combustion chamber, because the temperatures at the valve tip are too high. As an alternative, metal-to-metal seals having two metallic sealing partners are able to be used at very high temperatures and high mechanical stressing. These two sealing partners ensure sufficient tightness for liquid fuels even for very high numbers of switching cycles, but problems arise with gaseous fuels because of the high wear of the valve seat that occurs. This is attributable to the lack of hydraulic damping, which is present when liquid fuel is involved. In the case of gaseous fuels, however, the repeated impacts of a tappet or the like on the valve seat leads to increased wear and undesired noise.

It would therefore be desirable, especially for gaseous fuels, to have an injector featuring an adequate service life as well as tightness.

SUMMARY OF THE INVENTION

In contrast, the injector according to the present invention having the features of claim 1 has the advantage of providing sealing in the closed state of the injector in such a way that a sealing region is configured between a first and a second sealing element, e.g., a tappet and a valve seat, and of providing an elastic deformation region in addition, which is set apart from the sealing region. As a result, the sealing function in the present invention is separate from the deformation function (absorption of the impact pulses). This makes it possible to largely protect the sealing region from wear, which has a very positive effect on the service life of such injectors. In addition, the separation of sealing and elastic shaping according to the present invention reduces force spikes, noise development and wear. In the present invention, this is achieved in that the injector includes two sealing partners, i.e., a first sealing element and a second sealing element, a sealing region being formed between the first and second sealing element in the closed state of the injector. In addition, at least one of the sealing elements is provided with an elastic deformation region, which is set apart from the sealing region between the two sealing elements. The result is a local separation of the sealing and deformation regions.

The dependent claims indicate further developments of the present invention.

The first and second sealing element may be configured in such a way that rolling takes place between the first and the second sealing element during the closing process of the injector, until the two sealing elements are in the sealing position. The rolling is facilitated by the elastic deformation region that is spatially separated from the sealing region. At least one of the sealing elements may have a curved rolling surface in cross-section. It especially may be the case that the first sealing element has a curved rolling surface and the second sealing element has a conical shape. This makes it possible to achieve excellent rolling between the two sealing elements during the closing operation of the injector.

According to one further development of the present invention, exactly only one of the sealing elements includes the elastic deformation region. This makes it possible to achieve a reliable and calculable elastic deformation. As an alternative, each of the two sealing elements is provided with an elastic deformation region.

The two sealing elements may be metallic sealing elements. As an alternative, both sealing elements are ceramic sealing elements. It is furthermore also possible for the two sealing elements to have a coating.

According to one further specific development of the present invention, the first sealing element is stationary, and the second sealing element is disposed so as to allow movement. The elastic deformation region may be situated on the movable sealing element. As an alternative, the elastic deformation region is situated on the stationary sealing element. As a further alternative, an elastic deformation region is provided on each sealing element.

Particularly secure sealing of the injector results if a first and a second sealing region are configured between the first and second sealing elements in the closed state of the injector. In an especially particular manner, the first and the second sealing regions lie in a common plane. Especially particularly, the plane extends perpendicularly to a center axis of the injector. The elastic deformation region may be situated between the first and second sealing region.

In addition, the present invention relates to an internal combustion engine which includes a combustion chamber and an injector according to the present invention. The injector may be situated directly at the combustion chamber for the direct introduction of fuel into the combustion chamber. Especially particularly, the injector is an injector which blows gaseous fuel directly into the combustion chamber of the internal combustion engine.

Moreover, the present invention relates to a method for closing an injector, in particular a blow-in injector, it being possible to provide sealing between a first and a second sealing element and to enable rolling between the first and second sealing element by providing an elastic deformation region, the elastic deformation region being situated at a distance from the sealing region and enabling the rolling process between the two sealing elements.

Exemplary embodiments of the present invention are described in detail below, with reference to the accompanying drawings.

DETAILED DESCRIPTION

In the following text, an injector 1 according to a first exemplary embodiment of the present invention is described in detail with reference to FIGS. 1 through 3.

Figure 1:
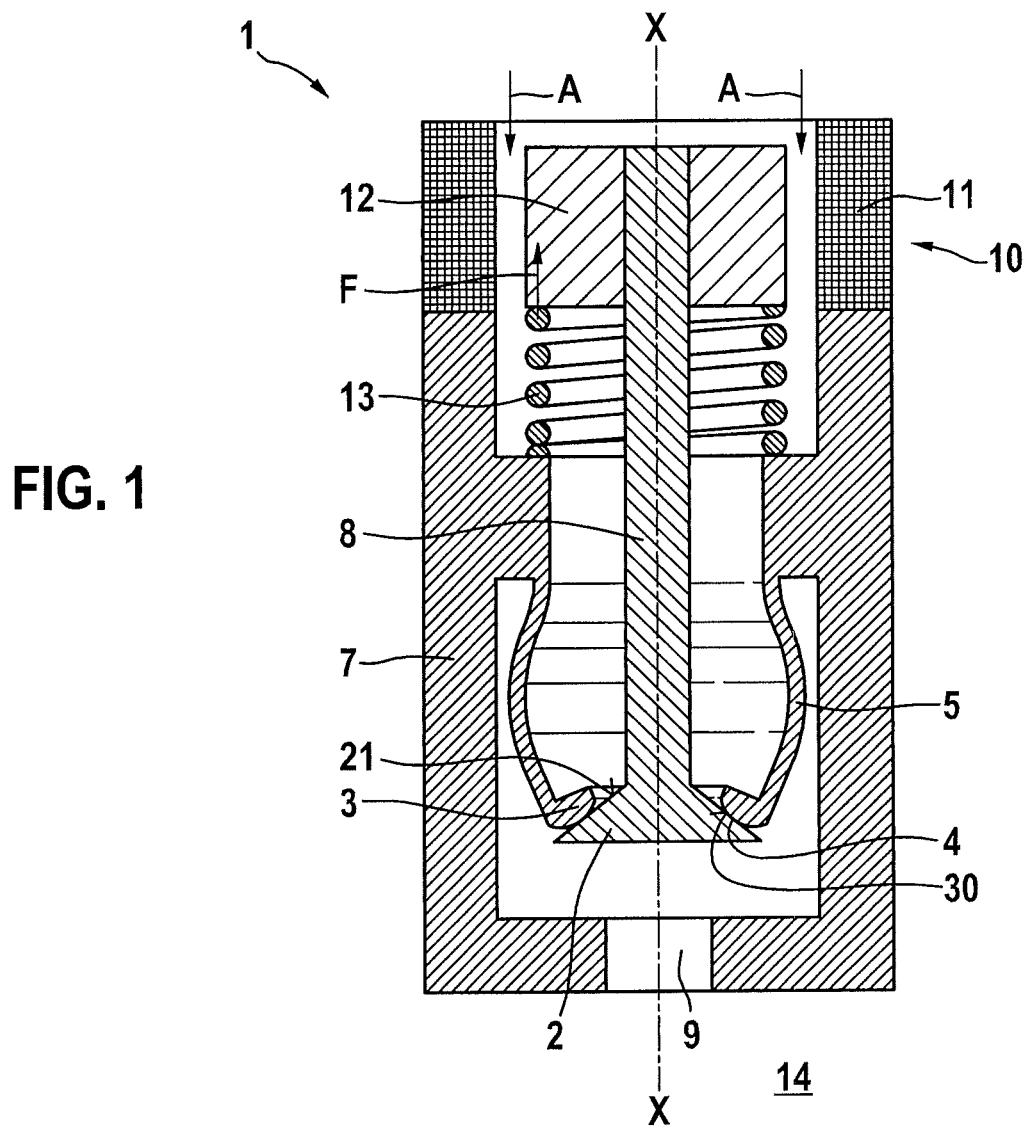
FIG. 1 shows a schematic view of an injector according to a first exemplary embodiment of the present invention.

FIG. 1 schematically illustrates the structure of injector 1, which is a blow-in injector in this exemplary embodiment, which injects directly into a combustion chamber 14. Injector 1 includes a first sealing element 2 and a second sealing element 3. FIG. 1 shows the closed state of injector 1. A first sealing region 4 is configured between the two sealing elements 2, 3. In addition, an elastic deformation region 5 is provided on second sealing element 3, separately from sealing region 4.

First sealing element 2 is configured in one piece with a valve needle 8 and has a tapering sealing surface 21. Sealing surface 21 may be conical. Second sealing element 3 is cylindrical in the relaxed state (FIG. 2). At its radially inwardly directed region second sealing element 3 is provided with an annular flange 31. An arched rolling surface 30 is configured on second sealing element 3.

To actuate valve needle 8, injector 1 additionally also includes an actuator 10 having a coil 11, an armature 12, and a restoring element 13.

Figure 2:
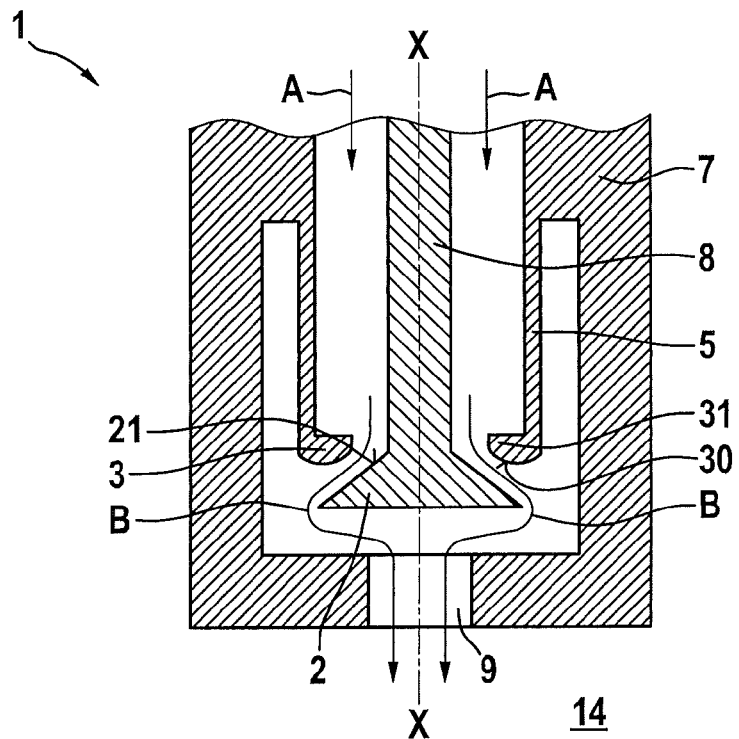
FIGS. 2 and 3 show schematic partial views of the injector from FIG. 1, in the open and closed state.
Figure 3:
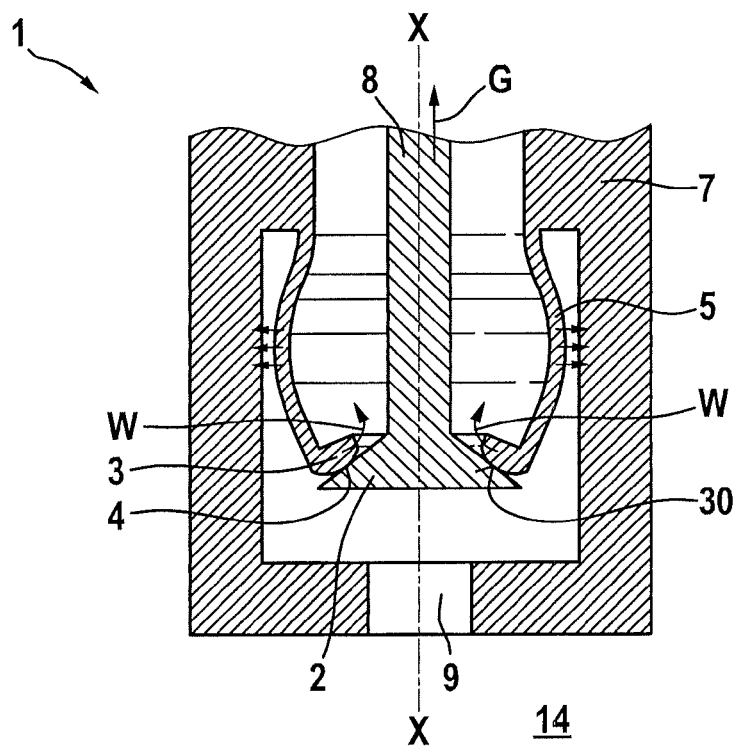

FIG. 2 provides a detailed view of the open state of the injector, and FIG. 3 provides a detailed view of the closed state of the injector. A comparison of the two figures reveals that elastic deformation region 5 of second sealing element 3 is elastically deformed in the closed state of the injector (FIG. 3). This results in a barrel-type shape of second sealing element 3. In the open state (FIG. 2), in which second sealing element 3 is unloaded and no elastic deformation of elastic deformation region 5 is present, second sealing element 3 essentially has a cylindrical shape. Arrow B shows a through-flow of the gaseous fuel through open injector 1 via a schematically indicated spray orifice 9 into combustion chamber 14.

Injector 1 according to the present invention operates in the following manner. In the closed state (FIGS. 1 and 3), restoring element 13 keeps injector 1 closed. In so doing, force F of the restoring element moves valve needle 8 and first sealing element 2 in the direction of arrow G, as sketched in FIG. 3, so that first sealing element 2 rests against second sealing element 3, and first sealing region 4 is closed. During the closing operation of the injector, arched rolling region 30 of second sealing element 3 executes a rolling movement W featuring minimal slip. This makes it possible to prevent damage to the sealing partners.

In the open state (FIG. 2), fuel is able to flow into combustion chamber 14, as indicated by arrows A and B. According to the present invention, sealing region 4 and elastic deformation region 5 are locally separated from each other. This makes it possible to protect sealing region 4 from wear. Elastic deformation region 5 provides considerable elastic deformation, so that force peaks are avoided in addition, and no undesired noise development occurs. Moreover, no elastomeric sealing element has to be provided on one of the sealing partners in the present invention. This makes the injector of the present invention especially suitable for directly injecting fuel injectors and allows it to be situated directly at combustion chamber 14. The two sealing partner in sealing region 4 may be metallic.

A further advantage of the separation of sealing region 4 and elastic deformation region 5 according to the present invention is that it is possible to find an individually optimal solution for each of the two regions, so that even the most varied specifications of different manufacturers of internal combustion engines are able to be satisfied. For example, an individual coating may additionally be provided on first and/or second sealing element 2, 3 in order to optimize rolling motion W and/or the tightness.

Figure 4:
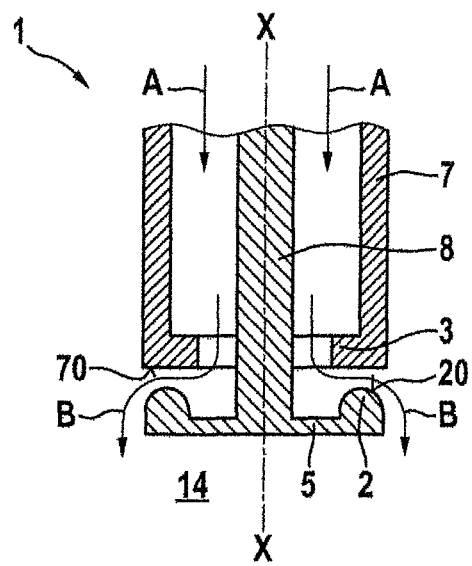
FIGS. 4 and 5 show schematic part-sectional views of an injector according to a second exemplary embodiment, in the open and closed state.
Figure 5:
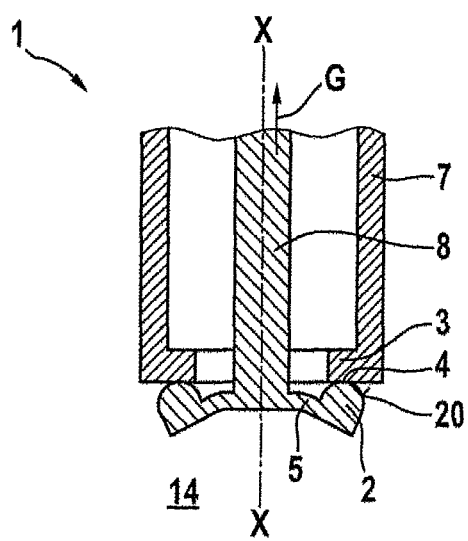

FIGS. 4 and 5 shows an injector 1 according to a second exemplary embodiment of the present invention, in which identical or functionally identical components have been designated by the same reference numerals. FIG. 4 shows the open state of the injector, and FIG. 5 illustrates the closed state of the injector.

It is clear from FIG. 5 that in this exemplary embodiment elastic deformation region 5 is provided on first sealing element 2. First sealing element 2 has an arched rolling region 20. This arched rolling region 20 is semicircular in cross-section. The sealing region on second sealing element 3 is situated on an outer side 70 of a flange region of valve sleeve 7, which lies in the axial direction of a center axis X-X. In all other respects this exemplary embodiment is equivalent to the previous exemplary embodiment, so that reference can be made to the description supplied there.

Figure 6:
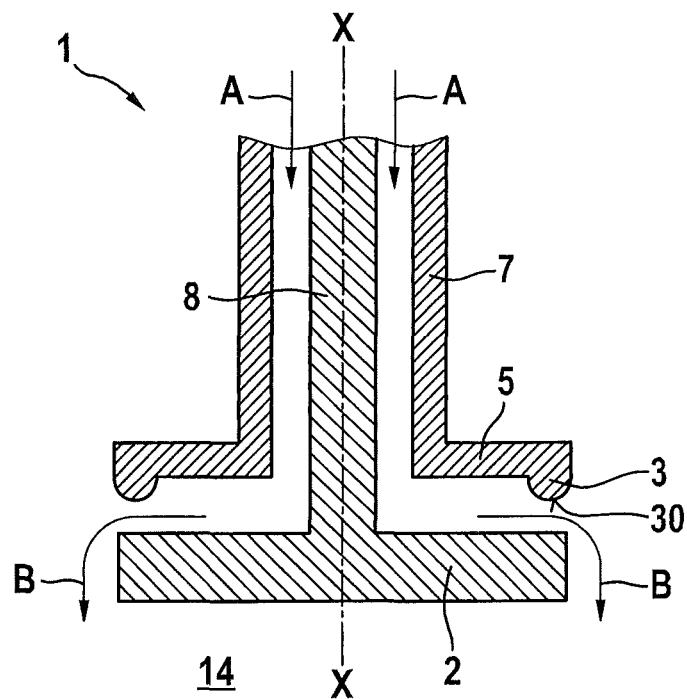
FIGS. 6 and 7 show schematic part-sectional views of an injector according to a third exemplary embodiment, in the open and closed state.
Figure 7:
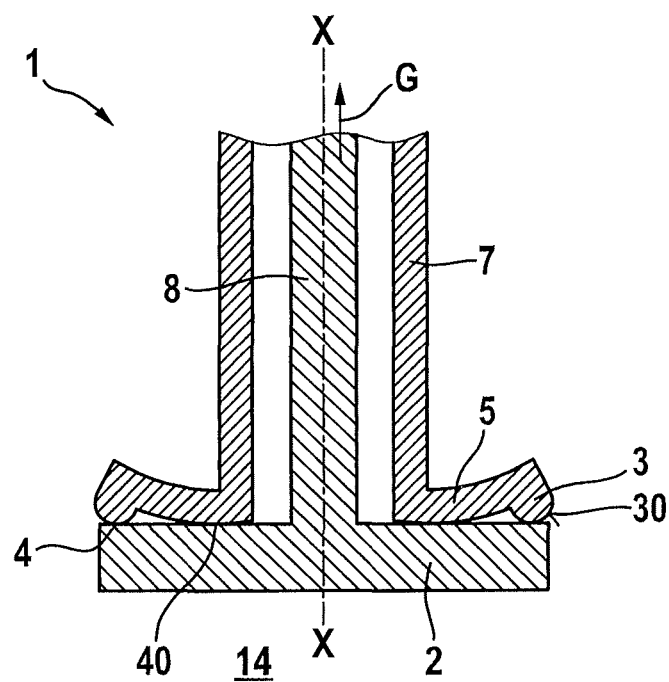

FIGS. 6 and 7 show a detailed view of an injector 1 according to a third exemplary embodiment of the present invention. FIG. 6 illustrates the open state of the injector, and FIG. 7 the closed state of the injector. In the third exemplary embodiment, elastic deformation region 5 is once again formed on second sealing element 3. Also formed on second sealing element 3 is arched rolling region 30, similar to the first exemplary embodiment. In contrast to the previous exemplary embodiments, the injector of the third exemplary embodiment includes a second sealing region 40 as well, in addition to first sealing region 4. First sealing region 4 and second sealing region 40 lie in a plane perpendicular to center axis X-X of the injector. In the third exemplary embodiment, second sealing region 40 results from the elastic deformation in deformation region 5, so that dual sealing between the two sealing partners (first and second sealing element 2, 3) is made possible in this particular exemplary embodiment. Second sealing region 40 is protected from wear and from direct contact with the combustion chamber by the deformation in deformation region 5. The relatively large distance between sealing and impact region 4 and second sealing region 40 allows the implementation of further sealing concepts, such as the use of elastomers, for instance.

What is claimed is:

1. An injector, comprising:
   a first sealing element; and
   a second sealing element;
   wherein a first sealing region is configured between the first and second sealing elements in the closed state of the injector,
   wherein at least one of the sealing elements has an elastic deformation region, wherein the elastic deformation region is situated at a distance from the sealing region of the sealing elements, wherein the elastic deformation region of the second sealing element extends along a vertical axis of a valve needle of the injector, wherein in a closed state of the injector, the second sealing element has a barrel-type shape in the elastic deformation region, wherein in an open or relaxed state of the injector, the second sealing element has a cylinder-type shape in the elastic deformation region, wherein the elastic deformation region is an integral part of the at least one of the sealing elements, and wherein an arched rolling surface is configured as part of the second sealing element so as to contact the first sealing element in the first sealing region.

2. The injector of claim 1, wherein precisely one of the sealing elements has the elastic deformation region.

3. The injector of claim 1, wherein the second sealing element is stationary, and the first sealing element is movable, and the elastic deformation region is situated on the second, stationary sealing element.

4. The injector of claim 1, wherein the injector is a blow-in injector for gaseous fuel.

5. An internal combustion engine, comprising:
a combustion chamber; and
an injector, including a first sealing element and a second sealing element, wherein a first sealing region is configured between the first and second sealing elements in the closed state of the injector, wherein at least one of the sealing elements has an elastic deformation region, and wherein the elastic deformation region is situated at a distance from the sealing region of the sealing elements;
wherein the injector is situated directly at the combustion chamber for directly introducing fuel into the combustion chamber,
wherein the elastic deformation region of the second sealing element extends along a vertical axis of a valve needle of the injector,
wherein in a closed state of the injector, the second sealing element has a barrel-type shape in the elastic deformation region,
wherein in an open or relaxed state of the injector, the second sealing element has a cylinder-type shape in the elastic deformation region,
wherein the elastic deformation region is an integral part of the at least one of the sealing elements, and
wherein an arched rolling surface is configured as part of the second sealing element so as to contact the first sealing element in the first sealing region.

6. The internal combustion engine of claim 5, wherein the injector is a blow-in injector.

7. A method for closing an injector, the method comprising:
enabling rolling, wherein sealing is possible between a first sealing element and a second sealing element, between the first and second sealing elements by providing an elastic deformation region;
wherein the elastic deformation region is at a distance from the sealing region and enables the rolling process between the two sealing elements,
wherein the elastic deformation region of the second sealing element extends along a vertical axis of a valve needle of the injector, and
wherein in a closed state of the injector, the second sealing element has a barrel-type shape in the elastic deformation region,
wherein in an open or relaxed state of the injector, the second sealing element has a cylinder-type shape in the elastic deformation region,
wherein the elastic deformation region is an integral part of the at least one of the sealing elements, and
wherein an arched rolling surface is configured as part of the second sealing element so as to contact the first sealing element in the first sealing region.

8. The method of claim 7, wherein the injector is a blow-in injector.

* * * * *